May 14, 1968     R. SERRELL ETAL     3,382,588
RESPONSE EXPRESSION APPARATUS FOR TEACHING MACHINES
Filed Jan. 11, 1965     4 Sheets-Sheet 1
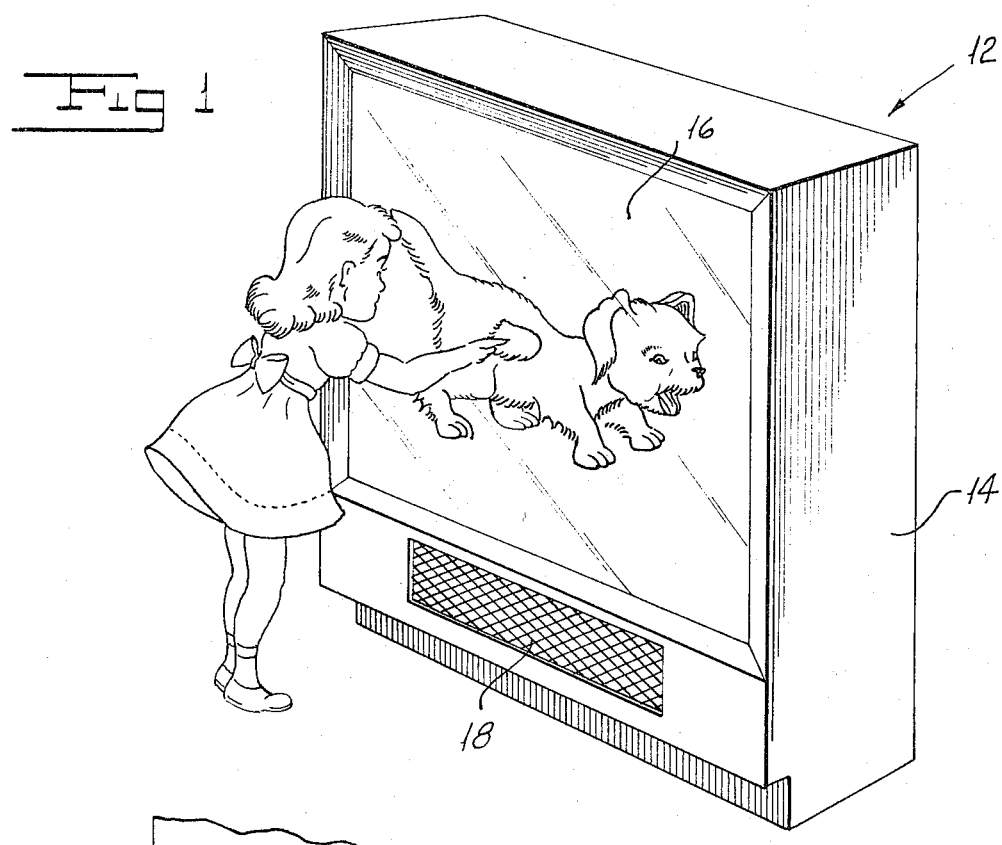
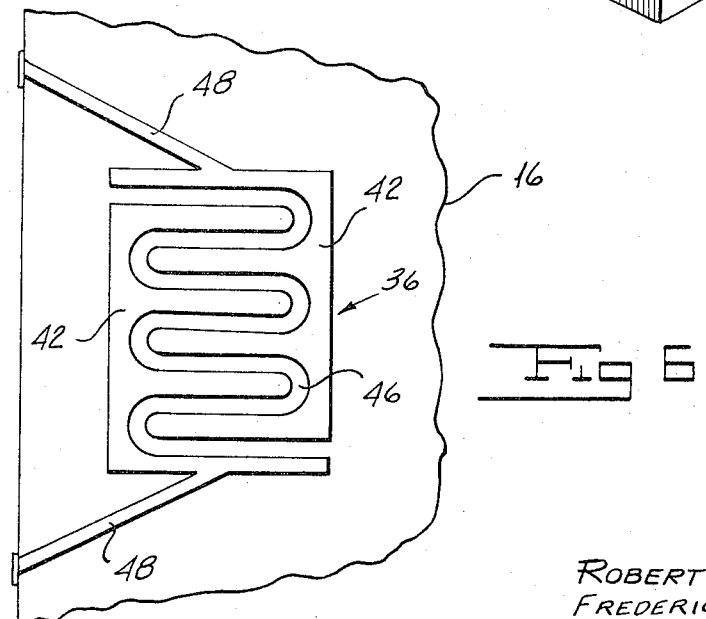
INVENTORS
ROBERT SERRELL
FREDERICK R. KLING
BY
Shenier & O'Connor
ATTORNEYS May 14, 1968 R. SERRELL ETAL 3,382,588
RESPONSE EXPRESSION APPARATUS FOR TEACHING MACHINES
Filed Jan. 11, 1965 4 Sheets-Sheet 2
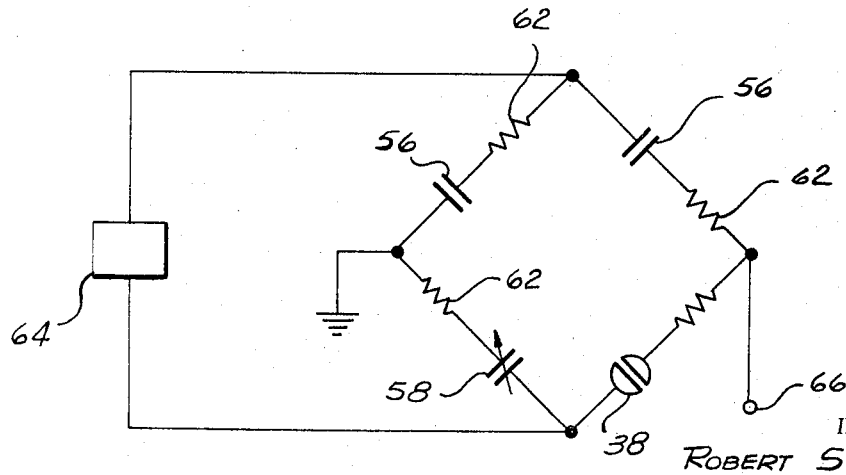

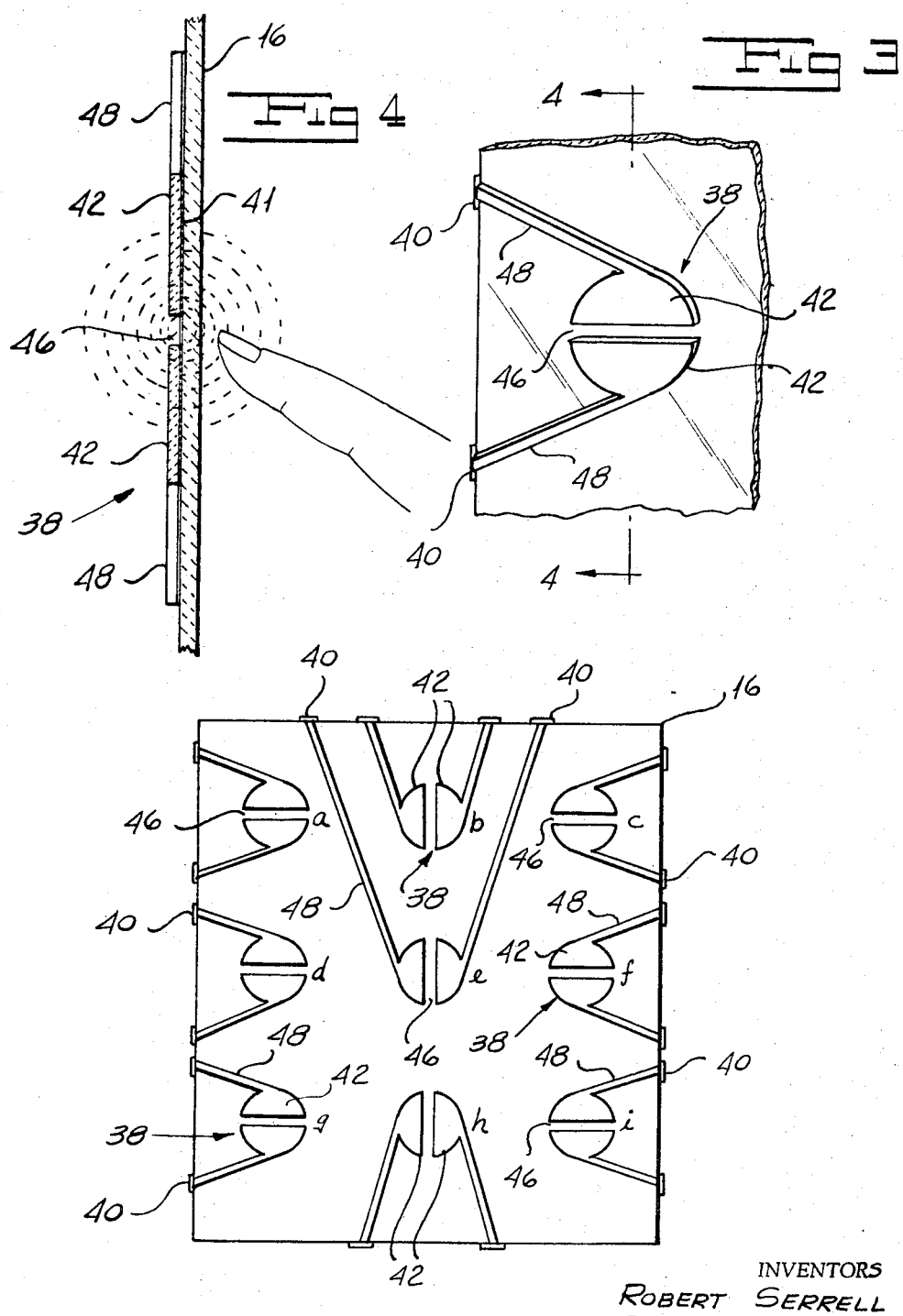

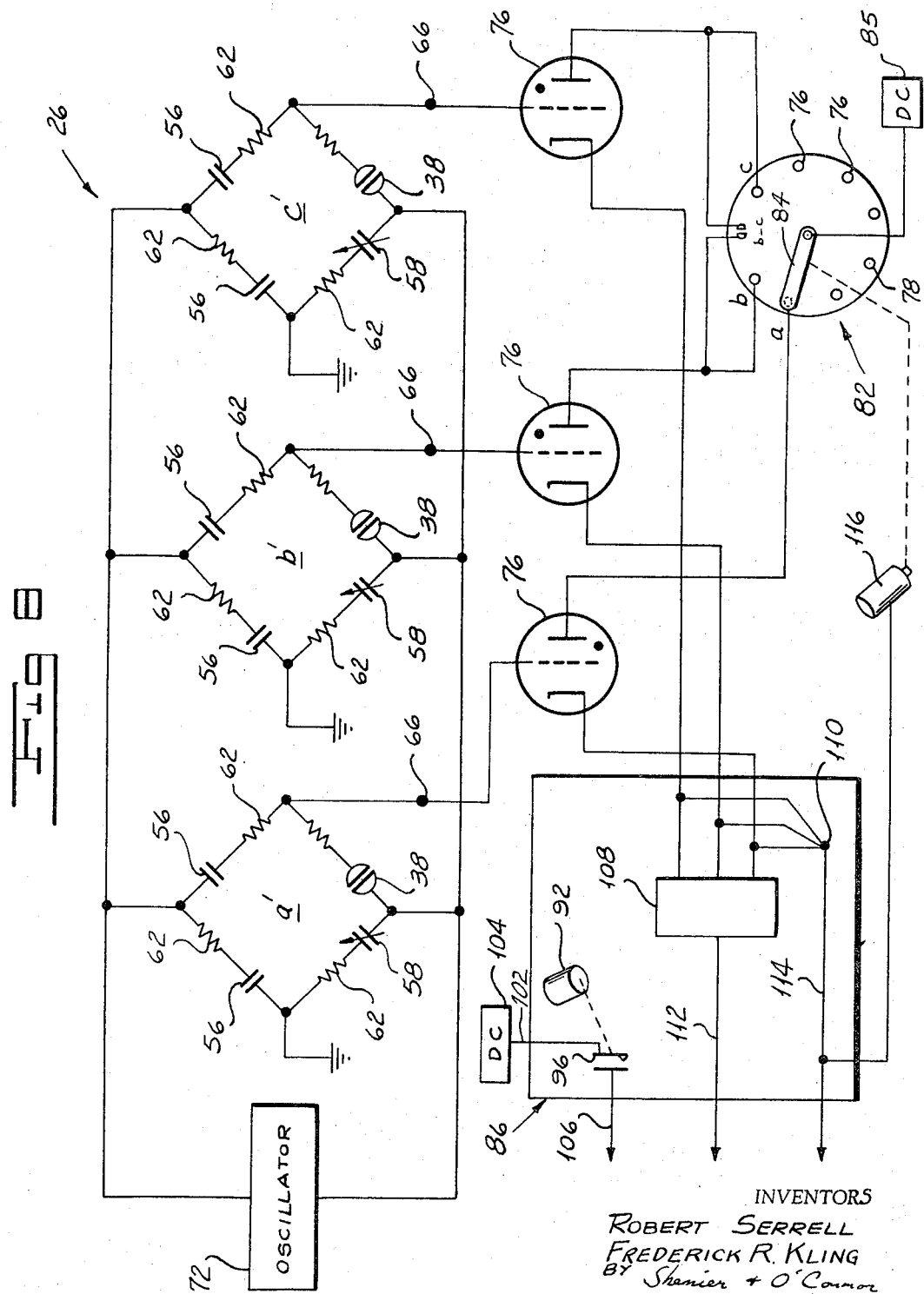

United States Patent Office 3,382,588
Patented May 14, 1968

3,382,588
RESPONSE EXPRESSION APPARATUS FOR
TEACHING MACHINES
Robert Serrell, Princeton, N.J., and Frederick R. Kling,
Point Pleasant, Pa., assignors to Educational Testing
Service, Princeton, N.J., a nonprofit corporation of New
York
Filed Jan. 11, 1965, Ser. No. 424,545
14 Claims. (Cl. 35—9)

Our invention relates to teaching machines and, more particularly, to an improved response expression apparatus for teaching or amusement machines.

There are a large number of teaching machines in common use in which automatic voice instruction is supplied by a tape recorder or the like for a single student supplemented by pictorial information projected upon a screen by a slide or moving picture projector. Commonly, a number of questions are successively posed to a student. Immediately following each question the voice instruction stops, and a definite response to each question is required from the student before automatic instruction resumes. In such machines projection on the screen is usually, and most conveniently, made from the rear of the screen. That is, the projector is housed inside the machine and projects the picture upon the rear of a ground glass or other translucent screen which is viewed by the student from the other side. The student's response in prior art machines is usually expressed by actuating one or more of a number of suitably identified buttons or the like.

Teaching machines of the type described above are generally satisfactory. However, in some cases, particularly in the case of machines designed for use with very young children, such as preschool children, the response actuating mechanism—push buttons for example—are too difficult for a child of such tender years. For this reason these teaching machines, although potentially useful, have not been successfully employed for teaching very young children.

Our invention allows the use of teaching machines for very young children. The child's response can be natural and spontaneous and does not distract his attention from the subject matter being taught.

One object of our invention is to provide a simple means of expressing responses to an instruction related to a definite part of a fixed or moving image projected on a screen.

Another object of our invention is to provide response apparatus which permits a natural and spontaneous expression of response.

A still further object of our invention is to provide a response expression mechanism which does not require well developed coordination.

Still another object of our invention is to provide a response expression apparatus for teaching machines which has no moving parts and is resistant to wear and abuse.

An additional object of our invention is to provide response expression apparatus which can be actuated by momentarily touching, with a finger or hand, various areas on the viewing side of a ground glass projection screen.

In general, our invention contemplates the provision of a translucent projection screen having discrete, touch sensitive areas which are correlated with the picture projected on it. Each touch sensitive area comprises a transparent capacitor formed from translucent or transparent conductive plates, affixed to the rear of the screen. The capacitors are connected to a source of electrical energy, and the plates of each capacitor are arranged so that the electrical field between them has a large leakage component extending into the space beyond the front of the screen. Touching the front of the screen in certain areas— the touch sensitive areas—alters the leakage field of the capacitor in that area. When the capacitor's leakage field changes, its capacitive reactance changes. To sense these changes in capacitive reactance, we connect each capacitor on the screen in a respective capacitance bridge circuit. The bridge circuits can be coupled to the lesson circuitry in any manner known in the art, so that when a person touches the screen one of the bridge circuits is unbalanced to register his response to the question presented.

In the accompanying drawings which form part of the instant specification and which are to be read in conjunction therewith, and in which like reference numerals are used to indicate like parts in the various views:

FIGURE 1 is a perspective view of a teaching machine cabinet equipped with our novel response expression apparatus;

FIGURE 2 is a schematic drawing of a teaching machine with the cabinet removed;

FIGURE 3 is a fragmentary view showing the construction of one embodiment of a portion of our new touch responsive projection screen;

FIGURE 4 is a sectional view drawn on an enlarged scale taken along the line 4—4 of FIGURE 3;

FIGURE 5 is a diagrammatic view of a capacitive bridge circuit used in our invention;

FIGURE 6 shows another embodiment of a touch sensitive capacitor which has a configuration giving it a large response area;

FIGURE 7 is a view illustrating one positional distribution of the touch sensitive areas on a projection screen; and FIGURE 8 is a diagrammatic view of a circuit which may be employed in the practice of our invention.

More particularly, referring now to the drawings, we show a teaching machine indicated generally by the reference numeral 12 having a housing 14. A translucent, touch sensitive projection screen 16 is positioned at the front of the housing 14. We locate a loud speaker opening 18 on one side of the housing. Housing 14 advantageously houses all of the teaching equipment, which typically includes a record player 22, such as a tape player, a slide or film projector 24, and programing and control apparatus 26. The projector 24 projects the pictorial part of the lesson onto translucent screen 16 from its rear by means of a system including a mirror 28 and a lens 32. Since projection systems of this type are well known in the art, we have shown the projection system only schematically.

FIGURES 3 and 4 show how we form the capacitors on the screen 16, which is comprised of a piece of ground glass, or other suitable translucent material. On the rear of this screen we form a plurality of transparent or translucent capacitors similar to the single capacitor generally indicated by the reference numeral 38 in FIGURE 3. Capacitor 38 is visible in the drawing for purposes of illustration, but it will be understood that in the preferred embodiment of our invention these capacitors are transparent.

Each capacitor 38 has two transparent conductive electrodes or plates 42 which can be bonded to the screen 16 by means of a suitable transparent adhesive 41 known in the art. A transparent conductive lead 48 connects each plate 42 to a respective conductive terminal 40, each of which is affixed to the edge of the screen 16. The leads 48 can be formed from the same material as the plates 42 and can be secured to the screen 16 the same way as the plates. We find that it is advantageous to form each plate 42 and its respective lead 48 integrally, eliminating the need for connecting the plate to its lead.

In a preferred embodiment the screen 16 comprises a piece of borosilicate glass, one surface of which is ground. We form the plates 42 from a commercially available, electrically conducting coating fired onto the smooth surface of the glass screen. A suitable coating is available from Corning Glass Works, P.O. Box 544, Corning, N.Y., and it comprises a preparation of tin and antimony oxides. We use a silk-screen process to apply the tin and antimony oxide preparation to the smooth surface in the desired pattern for the plates 42 and their respective leads 48. An alternative to the silk-screen process is to spray the tin and antimony oxide preparation through a suitably patterned stencil. We bond the tin and antimony oxide preparation to the glass by firing the whole screen 16 to the glass-annealing temperature after the conductive pattern has been applied to its smooth surface. Each of the plates 42 so obtained is less than one thousandth of an inch thick and has a surface area which is very large relative to its thickness, as for example, 4 square inches. We prefer to make the plates 42 as thin as possible to prevent distortion of the picture projected through them on screen 16. We place the plates 42 closely adjacent to one another, separated along one of their edges by an electrically insulated air gap 46, which is approximately $\frac{1}{16}$ inch to $\frac{1}{8}$ inch wide.

When the plates 42, which form the capacitor 38 are connected to a source of electrical energy, the electric field between the plates is not confined to the narrow gap 46. Because the plates 42 are both in the same plane, the electric field across the gap 46 has a large leakage component which bulges out into the space surrounding gap 46 and extends beyond the front of screen 16.

The capacitive reactance of the capacitors 38 depends not only on the dielectric constant of the material in the gap 46, but also to a very large extent upon the dielectric constant of the material in the leakage field. Although the capacitive reactance of any capacitor depends to some extent on the dielectric constant of material in its leakage field, in the usual capacitor construction the leakage field and its effects are minimized so that they are negligible. With a planar construction, such as we use, there is a large leakage field, and changes in the dielectric constant of the material in this field cause a sensible change in the capacitive reactance of the capacitor. Thus when an object possessing a dielectric constant different from that of air enters leakage field of capacitor in front of the screen 16, a change in the capacitive reactance of that capacitor is induced. It will be understood by persons skilled in the art that any object with a dielectric constant different from that of air, such as a child's hand or finger entering the leakage field of a capacitor 38 will cause a sensible change in its capacitive reactance. Actual contact with the screen 16 is not required to produce this result since mere proximity will vary the capacitive reactance. However, in most applications we prefer to adjust the sensitivity of the screen 16 to respond to actual contact of the hand or finger with its surface. Such a sensitivity reduces false indications, and usually gives the most satisfactory results. The most convenient way to adjust the sensitivity of the screen is to vary the potential across a capacitor 38.

The leakage field of a capacitor 38 extends in space far enough so that a change in the dielectric constant approximately $\frac{1}{8}$ inch from either edge of the gap 46 results in a detectable change in capacitance. A screen which uses capacitors formed as shown in FIGURE 3, therefore, has narrow touch sensitive areas. To form larger and wider touch sensitive areas we use capacitors 38 such as are constructed as shown in FIGURE 6. The capacitor there shown has two intermeshing transparent conductive plates 42 separated by an insulating gap 46 which is distributed uniformly over a rectangular area as shown. It will be appreciated by those skilled in the art that our invention is not limited to any particular shape of touch responsive area since any desired shape may be formed on the projection screen by distributing the gap which separates the conductive plates 42 uniformly over the area desired.

Advantageously, we use capacitance bridges to detect changes in the capacitive reactance of the capacitors 38. A typical bridge is shown in FIGURE 5. The bridge is a simple A.C. capacitance bridge with a capacitor 38 connected to form one of its legs. The other three legs are comprised respectively of two fixed capacitors 56 and a variable capacitor 58. Since the reactance of the transparent capacitor 38 and its transparent leads 48 is relatively high we add fixed resistors 62 in the other three legs of the bridge to balance it. An oscillator 64 connected across one pair of bridge terminals energizes the bridge. The bridge output is across the other diagonal and is coupled to output terminal 66. Both capacitors 56 have the same value of capacitive reactance at the frequency of power supply 64. We adjust the capacitive reactance of variable capacitor 58 to balance the capacitive reactance of capacitor 38. When the bridge is balanced, there is no output at terminal 66. When someone touches the screen in the area of a capacitor 38 its capacitive reactance changes, unbalancing the bridge and producing an output at terminal 66.

We arrange the pattern of touch sensitive areas to suit the type of material presented by the projections to be used in a particular machine. FIGURE 7 illustrates a typical distribution of touch sensitive areas on a screen and shows an array of nine discrete touch sensitive areas indicated by reference letters *a* through *i*. Each of these areas is made touch sensitive by a capacitor 38 which is formed on one side of the screen in the manner explained above. The gap of each of these capacitors is distributed uniformly over each area as we have described in connection with FIGURE 6. We prefer to space the touch sensitive areas about 3 or 4 inches apart to prevent overlapping of the leakage fields. Each capacitor 38 on the screen 16 establishes a single discrete touch sensitive area.

FIGURE 8 shows a typical arrangement for utilizing the output of capacitance bridges and for correlating the touch sensitive areas with the picture projected on the screen. It should be noted that the particular arrangement shown in FIGURE 8 is merely exemplary and other and different circuit assemblies known to the art can be used in the practice of our invention. The choice of the particular circuit to be used will be largely dictated by the lesson or material presented by the machine, as will readily be understood by those skilled in the art.

While any desired number of bridge circuits may be used corresponding to the number of touch areas, in the interest of simplicity of explanation, in FIGURE 8 we show only three bridge circuits, generally indicated by references *a'*, *b'* and *c'* to correspond to the areas *a*, *b* and *c* in FIGURE 7. It will be understood that each of the capacitors which form the remaining touch sensitive areas *d* through *i*, is connected in the same manner as that shown for the capacitors which form areas *a*, *b* and *c*. A single power supply oscillator 72 preferably powers all of the bridge circuits. The output terminal 66 of each bridge is connected to the grid of a respective thyratron tube 76. We connect the plates of these thyratron tubes to respective terminals 78 of a stepping switch 82. We have lettered the respective terminals *a*, *b*, *c*, and these terminals correspond to the areas *a*, *b*, *c*, on screen 16. The stepping switch 82 has a contacting arm 84 which is connected to a source of D.C. electrical energy 85.

We connect the cathode of each of the thyratron tubes 76 to a timing and program control circuit, generally indicated by the reference numeral 86, which includes a timing motor 92, a switch 96 and a counter circuit 108. Motor 92 periodically closes switch 96. A lead 102 connects one side of the switch 96 to a source of D.C. potential 104, and a lead 106 connects the output side of the switch to the record player 22. The cathode of thyratrons 76 are connected in parallel to counter circuit 108 and to a terminal 110. Lead 112 connects an output from the counter to the projector 24. A lead 114 connects terminal 110 to the record player 22 and also to a stepper motor 116 which drives arm 84 of switch 82. Counter circuit 108 produces an output signal on lead 112 after a predetermined number of input signals from the cathodes of thyratrons 76. A signal on lead 112 causes projector 24 to project the next picture in the desired teaching sequence. An input from lead 106 causes record player 22 to issue a command. An input from lead 114 causes tape or tone arm of record player 22 to advance so that the next input on lead 106 causes the next command in the lesson program to be played. A signal on lead 114 causes stepper motor 116 to drive arm 84 of stepping switch 82 to the next terminal 78.

In a typical operation a picture is projected on the screen 16, for example the dog shown in FIGURE 1. Timing motor 92 closes switch 96 and an output on lead 106 causes the record player 22 to give the command: "Point to the dog's head." The screen is positioned so that area a is under the dog's head. Arm 84 contacts terminal a of switch 82. If the child touches the screen 16 in area a, the capacitive reactance of capacitor 38 in area a changes, bridge a' is unbalanced, and its associated thyratron 86 fires. The plate potential required for firing is coupled to this thyratron from D.C. supply 85 through arm 84 and terminal a of switch 82. Once the thyratron tube 76 fires it conducts until its plate potential is lowered almost to zero. Current flowing through tube 76 from D.C. supply 85 is an input to counter 108. This current is also coupled by terminal 110 and lead 114 to record player 22 and to stepper motor 116. The tape in record player 22 advances so that the next command is in position to be played. Stepper motor 116 drives arm 84 to terminal b, which removes the plate potential from the fired thyratron 76 extinguishing conduction through it. If there are several commands for one picture in the lesson program, there will be no output from counter 108 until several inputs from the thyratrons 76 have been counted. Assume here counter 108 has an output for every three inputs. Of course this is a matter of choice since a new picture could be projected with each command if desired.

After a certain interval, timer motor again closes switch 96 causing record player 22 to issue the next command: "Point to the brown patch on the dog." This patch is in area b. Arm 84 has been moved to terminal b by motor 116. If the child has made a mistake and touches the dog's tail, in area c, for example, the response is incorrect and the lesson does not advance. The capacitance reactance of the capacitors 38 in the touched area changes, its bridge is unbalanced, but the thyratron coupled to it does not fire because there is no potential coupled to its plate. Only the thyratron associated with bridge b' has the plate potential required for firing. If the child does not touch the brown patch within the certain time interval, motor 92 again closes switch 96 and the previous command is repeated: "Point to the brown patch on the dog."

If the child now touches the screen 16 in area b the tape or tone arm of record player 22 advances, arm 84 moves to the next terminal and counter 108 accumulates another count. It will be noted in FIGURE 8 that in this next position arm 84 simultaneously contacts two terminals. One terminal is connected to the plate of the thyratron 76 associated with area b and the other is connected to the plate of the thyratron associated with area c. With arm 84 in this position a typical command from record player 22 would be: "Point to the dog's body." Now if the child touches the screen in the area b or c, both of which are correct for the command given, a thyratron 76 fires and the program advances. In this example, after three correct responses there is an output from counter 108 which causes projector 24 to project the next picture in the lesson.

It will be understood that our invention is not limited to any particular teaching program. It can be advantageously used with any of the programs and systems known in the art. Further, it will be apparent that while our invention has special application in machines designed for teaching young children, it can be advantageously used in other aplications, such as with amusement devices. Also, as will be apparent to those skilled in the art, our invention can advantageously be used in combination with a moving picture on the screen 16.

Thus it can be seen that we have accomplished the objects of our invention. Our invention provides a simple means of expressing responses to a command which is associated with a difinite part of a fixed or moving image projected on a screen. Our invention permits a natural, spontaneous response to the material presented. Our response apparatus is well suited for use with preschool children. It does not require developed muscular coordination; the child is not aware of our apparatus and it is subject to minimal wear from repeated touching. Our invention can advantageously be used in combination with a ground glass projection screen employing rear projection.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. Response expression apparatus comprising a translucent screen having a viewing surface adapted to have a representation projected thereon through the other surface thereof, a plurality of capacitors for producing a plurality of discrete energy fields which extend to said viewing surface, each of said capacitors including two coplanar transparent electrically conducting plates separated by an insulating gap, and means mounting said plates on the other surface of said screen whereby said representation passes through said plates in the course of being projected on said screen viewing surface.

2. Response expression apparatus comprising a ground glass translucent screen having a viewing surface adapted to have a pictorial representation projected thereon through the other surface of said screen, a plurality of capacitors for erecting discrete energy fields which extend to said viewing surface, each of said capacitors including two coplanar transparent glass electrically conducting plates separated by an insulating gap, and means mounting said plates on the other surface of said screen whereby said representation passes through said plates in the course of being projected on said screen viewing surface.

3. Apparatus of the class described comprising in combination, a housing, a translucent screen supported by said housing with one surface of said screen adapted to be viewed from the exterior of said housing, a plurality of transparent electrical capacitors for producing a plurality of discrete electrical energy fields which extend to the viewing surface of said screen means mounting said capacitors at discrete respective locations on the other interior surface of said screen, means for projecting a representation from within said housing through said capacitors and through said screen to said one surface thereof, and means responsive to changes in an energy field for indicating a reaction with said field.

4. Apparatus of the class described comprising in combination, a translucent screen having a viewing surface and having another surface, a plurality of transparent capacitors for producing a plurality of discrete electrical fields which extend to one surface of said screen, each of said capacitors comprising two transparent conductive plates extending in the same plane, said plates separated by an insulating gap, means mounting said capacitor plates on said other surface of said screen means for projecting a pictorial representation through said other surface to the viewing surface of said screen, and means responsive to changes in an electrical field for indicating a reaction with said field.

5. Apparatus of the class described comprising in combination, a housing, a translucent screen supported by said housing, one surface of said screen adapted to be viewed from outside of said housing, a plurality of transparent capacitors on the other surface of said screen for producing a plurality of discrete electrical fields which extend to the viewing surface of said screen forming discrete touch sensitive areas on said screen, each of said capacitors including two transparent conductive plates extending in the same plane, said plates separated by an insulating gap distributed throughout one of said touch sensitive areas, means mounting said plates on the inner surface of said screen, means within said housing for projecting a pictorial representation through said plates and through said screen to the viewing surface of said screen, and means responsive to change in an electrical field for correlating a corresponding touch sensitive area and the representation projected on said screen.

6. A response expression device as in claim 5 wherein said screen is a ground glass screen and said capacitor plates are made of transparent conductive glass.

7. Apparatus for indicating the response of an observer to an intelligible visual representation a part of which is to be identified including in combination, a screen having a viewing surface, means for projecting a visible image of said representation through said screen to the viewing surface thereof from a side thereon remote said viewing surface, a plurality of light transmitting proximity responsive devices adapted to be actuated by said observer, and means mounting said devices adjacent the remote side of said screen at locations registering with discrete respective areas of said image in the field of view of said observer, the construction and arrangement of said devices being such that said image passes through said devices and through said screen to said viewing surface and the devices are substantially indistinguishable to said observer in the presence of said image, selection of an area of said image by said observer causing actuation of the associated device.

8. Apparatus as in claim 7 including respective means responsive to actuation of said device and means for selectively enabling said responsive means.

9. Apparatus as in claim 8 in which said responsive means when enabled is adapted to change said image upon actuation of its associated device.

10. Apparatus as in claim 7 including means adapted to respond to actuation of a device and means for sequentially coupling said last-named means to said devices.

11. Apparatus as in claim 7 including means for providing an audible instruction to accompany said representation and time responsive means for actuating said audible instruction means to repeat its instruction.

12. Apparatus as in claim 7 in which said projecting means is disposed at one side of said screen and in which each of said proximity responsive devices comprises transparent generally coplanar capacitor plates on said one side of said screen.

13. In apparatus for determining the response of an observer to a visible representation, a translucent viewing screen having a viewing side and having a side remote said viewing side, a plurality of transparent proximity responsive capacitors, each of said capacitors comprising flat, generally coplanar plates having an air gap between edges thereof and means mounting said capacitors on said remote side of said viewing screen at a plurality of discrete locations.

14. In apparatus as in claim 13 including transparent leads extending from said capacitors to the periphery of said screen.

References Cited

UNITED STATES PATENTS

| | | | |
|---|---|---|---|
| 2,188,973 | 2/1940 | Bonner et al. | 340—258 |
| 2,435,880 | 2/1948 | Eilenberger | 324—60 |
| 2,659,533 | 11/1953 | Quinby et al. | 235—145 |
| 2,695,402 | 11/1954 | Gray | 340—258 |
| 2,782,406 | 2/1957 | Krakora | 340—258 |
| 3,056,907 | 10/1962 | Costanzo | 340—258 X |
| 3,095,653 | 7/1963 | Corrigan | 35—9 |
| 3,233,341 | 2/1966 | Exton | 35—9 |
| 2,975,345 | 3/1961 | Koller | 317—258 |

EUGENE R. CAPOZIO, *Primary Examiner.*

R. W. WEIG, *Assistant Examiner.*